United States Patent
Dragony et al.

(10) Patent No.: US 6,724,390 B1
(45) Date of Patent: Apr. 20, 2004

(54) ALLOCATING MEMORY

(75) Inventors: Joseph M. Dragony, Carmichael, CA (US); Prashant Sethi, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/474,651

(22) Filed: Dec. 29, 1999

(51) Int. Cl.⁷ .............................................. G06F 12/02
(52) U.S. Cl. ........................................ 345/543; 711/171
(58) Field of Search ................................ 345/541–544, 345/531, 537; 711/170–173

(56) References Cited

U.S. PATENT DOCUMENTS

| | | | | |
|---|---|---|---|---|
| 5,107,251 A | * | 4/1992 | Frank et al. ................ 345/531 |
| 5,113,180 A | | 5/1992 | Gupta et al. | |
| 5,247,634 A | * | 9/1993 | Cline et al. ................. 707/205 |
| 5,335,342 A | * | 8/1994 | Mattison .................... 345/542 |
| 5,675,793 A | * | 10/1997 | Crick et al. ................. 711/170 |
| 5,793,385 A | * | 8/1998 | Nale .......................... 345/542 |
| 5,796,413 A | * | 8/1998 | Shipp et al. ................ 345/531 |
| 5,900,885 A | * | 5/1999 | Stortz ........................ 345/537 |
| 5,905,853 A | | 5/1999 | Murakami | |
| 5,920,881 A | * | 7/1999 | Porterfield ..................... 711/2 |
| 5,930,827 A | | 7/1999 | Sturges | |
| 5,946,005 A | * | 8/1999 | Chiang et al. ............. 345/544 |
| 5,953,746 A | * | 9/1999 | Crocker et al. ............ 711/170 |
| 6,021,505 A | * | 2/2000 | Ayyagari et al. ........... 713/502 |
| 6,023,281 A | | 2/2000 | Grigor et al. | |
| 6,041,016 A | * | 3/2000 | Freker ...................... 365/238.5 |
| 6,085,269 A | * | 7/2000 | Chan et al. ................. 710/100 |
| 6,097,401 A | * | 8/2000 | Owen et al. ................ 345/562 |
| 6,304,935 B1 | * | 10/2001 | Strongin ..................... 345/520 |
| 6,308,248 B1 | | 10/2001 | Welker et al. | |
| 6,326,973 B1 | * | 12/2001 | Behrbaum et al. ......... 345/543 |
| 6,366,994 B1 | * | 4/2002 | Kalyur ....................... 711/173 |
| 6,369,813 B2 | * | 4/2002 | Pentkovski et al. ........ 345/419 |
| 6,370,633 B2 | * | 4/2002 | Sethi ......................... 711/206 |
| 6,377,268 B1 | * | 4/2002 | Jeddeloh ................... 345/542 |
| 6,378,082 B1 | * | 4/2002 | Rajappa et al. ............ 713/501 |
| 6,430,665 B1 | | 8/2002 | Allison et al. | |
| 2002/0188793 A1 | * | 12/2002 | Hunsaker et al. .......... 710/310 |

FOREIGN PATENT DOCUMENTS

| | | |
|---|---|---|
| EP | 0 513 433 | 9/1991 |
| EP | 0 851 353 | 12/1997 |
| WO | 98/14878 | 4/1998 |

OTHER PUBLICATIONS

Newman, Gary. "Memory Management Support for Tiled Array Organization." *Computer Architecture News*.20.4. Sep. 1992. 22–30.

* cited by examiner

Primary Examiner—Kee M. Tung
(74) *Attorney, Agent, or Firm*—Fish & Richardson P.C.

(57) ABSTRACT

Memory is allocated for use by a graphics processor. Available portions of system memory are identified by requesting an amount of system memory from an operating system and receiving locations of the available portions from the operating system. Those available portions are then allocated for use by the graphics processor.

16 Claims, 3 Drawing Sheets

ALLOCATING MEMORY

BACKGROUND OF THE INVENTION

This invention relates to allocating memory for use by a graphics processor.

A graphics processor requires large amounts of contiguous memory for processing and displaying images. Dedicated "graphics" memory may be provided to meet this requirement; however, this additional memory increases the costs associated with graphics processing.

Another approach is to allocate operating system (or "system") memory for use by the graphics processor. Traditionally, this approach required "locking down" large amounts of system memory for exclusive use by the graphics processor. The operating system was often left with an insufficient amount of memory as a result.

SUMMARY OF THE INVENTION

In general, in one aspect, the invention relates to allocating memory for use by a graphics processor. The invention features identifying available portions of system memory and allocating the available portions of system memory to the graphics processor.

Among the advantages of this aspect may be one or more of the following. Identifying available portions of system memory and allocating those available portions makes it possible for the graphics processor to use system memory without "locking down" large portions of that memory beforehand. As a result, the amount of dedicated memory required by the graphics processor can be reduced without substantially adverse effects to the operating system.

Other features and advantages of the invention will become apparent from the following description and drawings.

DESCRIPTION

Figure 1:
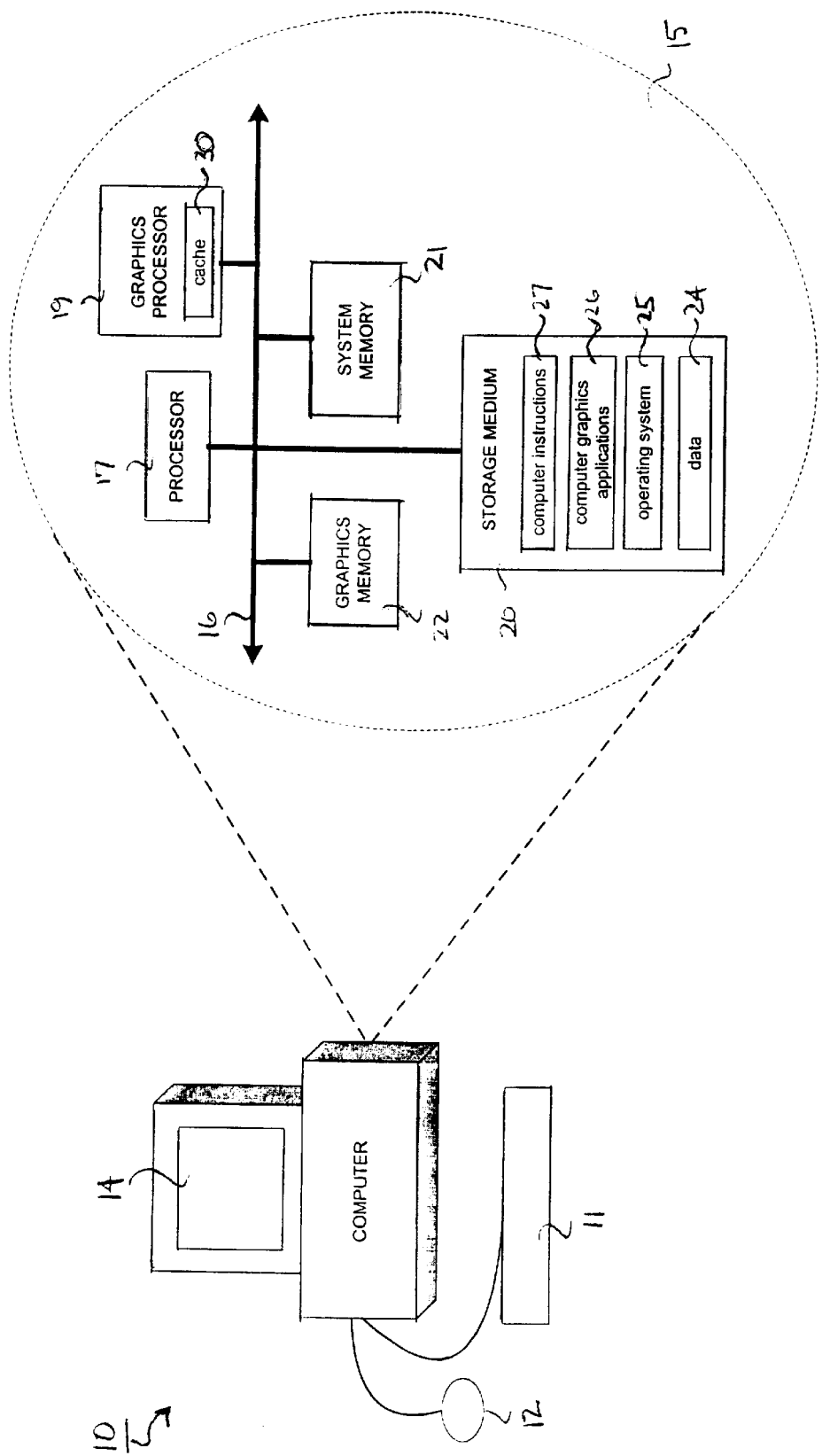
FIG. 1 is a view of a computer on which an embodiment of the invention may be implemented.

In FIG. 1, a computer 10 is shown on which an embodiment of the invention is implemented. Computer 10 includes input devices, such as keyboard 11 and mouse 12, and a display screen 14, among other things. Internal components of computer 10 are shown in view 15. These include one or more buses 16, processor 17, graphics processor 19, storage medium 20, system memory 21, such as a RAM ("Random Access Memory"), and graphics memory 22.

Storage medium 20 is a computer hard disk or other memory device that stores data 24, an operating system 25, such as Microsoft® Windows98®, computer graphics applications 26, and computer instructions 27 for allocating memory for use by graphics processor 19. Graphics processor 19 is a microprocessor or other device that may reside on a graphics accelerator card (not shown) on computer 10. Graphics processor 19 executes graphics applications 26 to produce imagery, including video, based on data 24.

Figure 2:
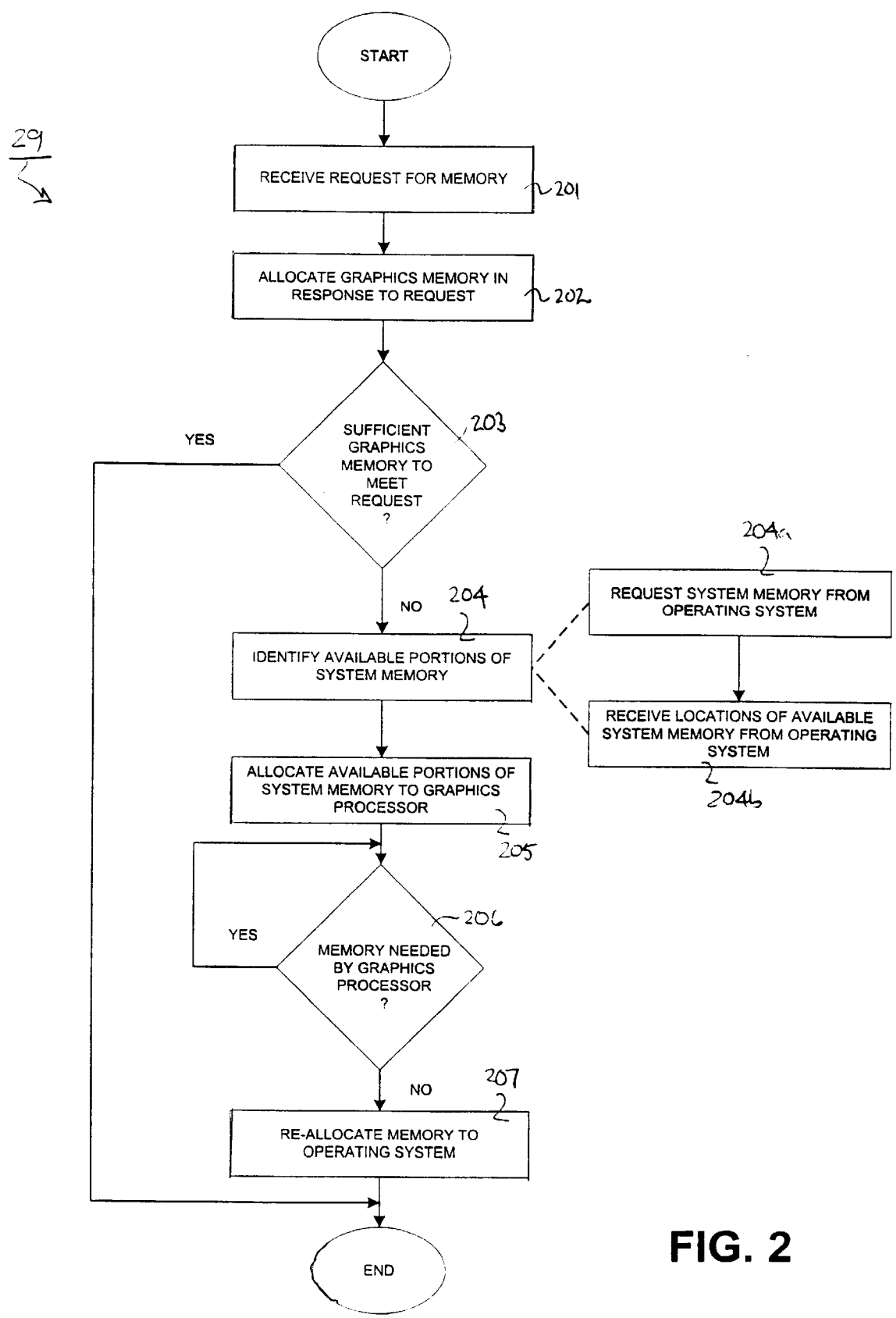
FIG. 2 is a flowchart showing a process for allocating memory to a graphics processor according to one embodiment of the invention.

During operation, graphics processor 19 requires memory to process data 24 and to generate images based on that data. In this embodiment, both graphics memory 22 and portions of system memory 21 are used by graphics processor 19 for these purposes. A process 29 for dynamically allocating such memory to graphics processor 19 is shown in FIG. 2. Process 29 is implemented by instructions 27 running on processor 17.

To begin, a memory manager driver (not shown) in computer 10 makes a determination as to how much memory it will need to execute a given graphics application. The driver then formulates a request for the required amount of memory. Process 29 (executing in processor 17) receives (201) the request and, In response, allocates (202) available portions of graphics memory 22 (also referred to as graphics "aperture") to graphics processor 19. This may be done via a memory map, as described in more detail below.

If the amount of available memory in graphics memory 22 is sufficient to satisfy the request as determined by the driver, memory allocation process 29 ends. If there is not sufficient available graphics memory (203), process 29 allocates available portions of system memory 21 to make up for the deficit of graphics memory.

To this end, process 29 identifies (204) available portions of system memory 21. Process 29 requests (204a), and receives (204b), the locations of available portions of system memory 21 from operating system 25. System memory 21 is addressable in "pages" (or blocks), each of which is typically four KB ("KiloBytes") in size. The locations of available system memory provided by operating system 25 therefore correlate to available pages of memory.

These pages may be contiguous portions of system memory or, alternatively, they may be discontiguous portions of system memory 21. In either case, process 29 allocates (205) the available portions of system memory for use by graphics processor 19. To do this, process 29 generates a memory map to the available portions of system memory (and to graphics memory 22, if applicable). In this embodiment, the memory map is a page table that is generated by process 29 and programmed into an internal memory (cache) 30 of graphics processor 19. The table itself may already exist in cache 30, in which case process 29 reprograms the table.

Figure 3:
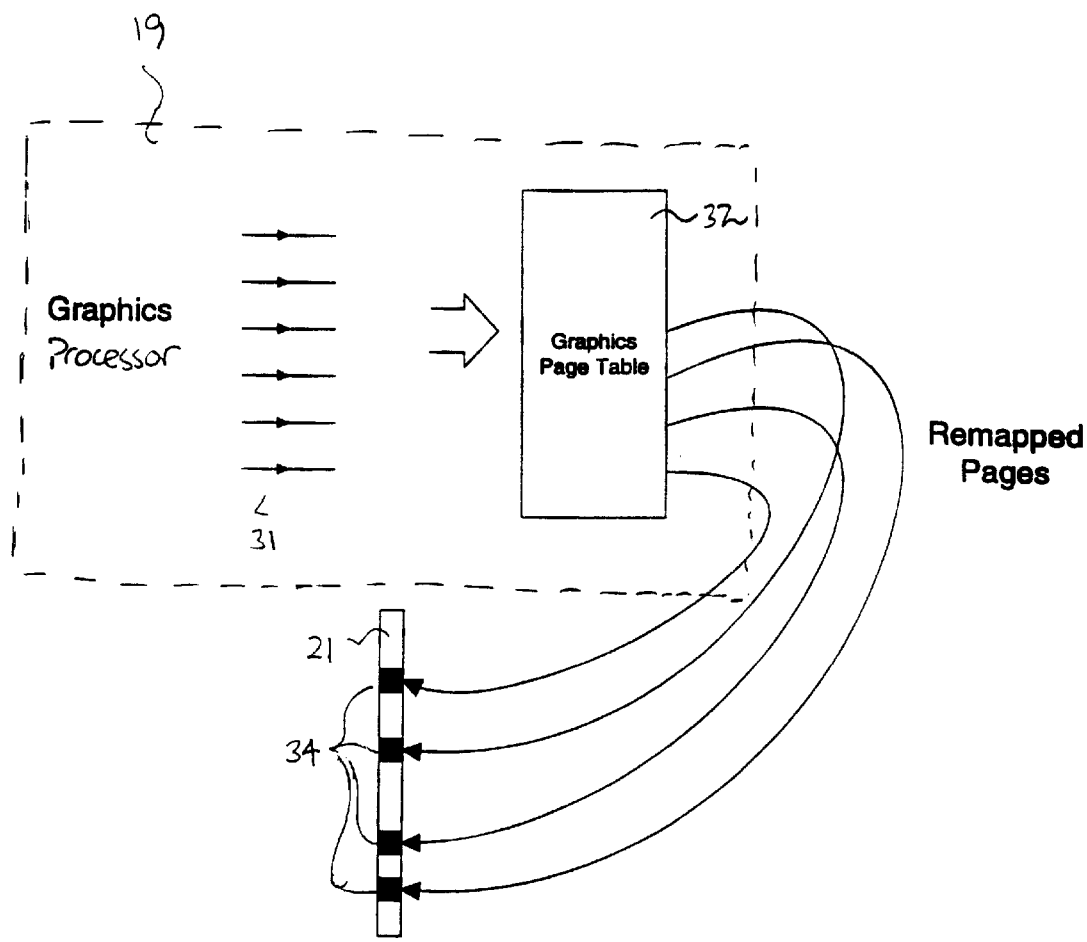
FIG. 3 is a block diagram that shows, conceptually, how memory is allocated by the process of FIG. 2.

The page cable maps physically discontiguous portions of system memory 21 and graphics memory so that they appear to graphics processor 19 to be a single contiguous memory. Contiguous addresses provided from graphics processor 19 are mapped to pages of available system memory 21 (and, possibly, graphics memory 22), without regard to whether those pages constitute contiguous memory. This concept is illustrated graphically in FIG. 3. There, graphics processor 19 outputs read/write requests 31 to contiguous memory addresses. These requests 31 pass through page table 32, which maps the contiguous memory addresses to discontiguous pages 34 of system memory 21 (and potentially, although not shown, graphics memory 22).

Once the appropriate amount of memory has been allocated, graphics processor 19 performs its image processing and generating functions out of that memory. When graphics processor 19 no longer needs the allocated memory (206), it issues an instruction to process 29. Process 29 then re-allocates (207) the system memory (allocated in 205) to operating system 25. This may be done by re-programming the page table in cache 30 so that system memory is no longer available to graphics processor 19. Process 29 also frees used graphics memory by providing unused graphics memory addresses to a "pool" of available addresses. When graphics processor needs additional memory, process 29 is repeated. Pseudo-code for implementing process 29 is shown in the attached Appendix.

Process 29 is described with respect to a computer that includes a dedicated graphics memory 22. However, process 29 also operates on computers that include no dedicated graphics memory. For example, all memory for graphics processor 19 may be allocated out of system memory 21. In this case, steps 202 and 203 are omitted from process 29, with the remainder of the process being identical to that shown in FIG. 2. Similarly, memory may be allocated to graphics processor 19 from other memories (in addition to those shown).

Although process 29 is described with respect to computer 10, process 29 is not limited to use with any particular hardware or software configuration; it may find applicability in any computing or processing environment. Process 29 may be implemented in hardware, software, or a combination of the two. Process 29 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform process 29 and to generate output information. The output information may be applied to one or more output devices, such as display screen 14.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 29. Process 29 may also be implemented as a computer-readable storage medium, configured with a computer program, where, upon execution, instructions in the computer program cause the computer to operate in accordance with process 29.

Other embodiments not described herein are also within the scope of the following claims. For example, the invention can be implemented on computer graphics hardware other than that shown an FIG. 1. The steps shown in FIG. 2 can be re-ordered where appropriate and one or more of those steps may be executed concurrently or omitted. Memory maps other than a page cable may be used in the invention, as can memory devices other than those shown in FIG. 1.

APPENDIX

```
GMM_Allocate (size)
{
    Allocate addresses from the graphics aperture;
    Allocate pages from the operating system;
    Program the page-table to commit appropriate
    addresses with pages allocated;
    Return base address of allocated region in graphics
    aperture to caller;
}
GMM_Free (address)
{
    Free address range to pool of unused graphics
```

APPENDIX-continued

```
    aperture addresses;
    Unmap pages allocated to address range in the page
    table;
    Return free pages to the operating system;
}
```

What is claimed is:

1. A method comprising:
   identifying available portions of a system memory;
   determining an amount of memory needed to execute a software application;
   allocating available portions of the system memory to a graphics processor memory in response to determining to form a contiguous software application memory;
   programming a page table to commit addresses of the available portions;
   executing the software application in the contiguous software application memory;
   freeing an address range of the contiguous software application memory;
   unmapping pages allocated to the address range in a page table; and
   deallocating the available portions of the system memory.

2. The method of claim 1 wherein allocating further comprises requesting an amount of system memory from an operating system and receiving locations of the available portions of system memory from the operating system.

3. The method of claim 1 wherein deallocating comprises re-allocating the available portions of system memory to an operating system after the available portions are no longer needed by the graphics processor, the available portions of system memory allocated in blocks.

4. The method of claim 1 wherein allocating comprises generating a memory map for the graphics processor to the available portions of system memory.

5. The method of claim 4 wherein the available portions of system memory comprise physically discontiguous portions of system memory and the memory map makes the physically discontiguous portions of system memory appear contiguous to the graphics processor.

6. A method comprising:
   identifying available portions of a system memory;
   determining an amount of memory needed to execute a software application by a graphics processor for processing data and generating images;
   allocating available portions of the system memory to the graphics processor, in response to determining, to form a contiguous software application memory;
   programming a page table to commit addresses of the available portions;
   executing the software application in the contiguous software application memory;
   freeing an address range of the contiguous software application memory;
   unmapping pages allocated to the address range in a page table; and
   deallocating the available portions of the system memory.

7. The method of claim 6 wherein the graphics processor is part of a graphics accelerator card.

8. The method of claim 6 wherein allocating further comprises requesting an amount of system memory from an operating system and receiving locations of the available portions of system memory from the operating system.

9. The method of claim 6 wherein deallocating comprises re-allocating the available portions of system memory to an operating system after the available portions are no longer needed by the graphics processor, the available portions of system memory allocated in blocks.

10. The method of claim 6 wherein allocating comprises generating a memory map for the graphics processor to the available portions of system memory.

11. The method of claim 9 wherein the available portions of system memory comprise physically discontiguous portions of system memory and the memory map makes the physically discontiguous portions of system memory appear contiguous to the graphics processor.

12. A computer program, tangibly stored on a computer readable medium, comprising instructions operable to cause a computer to:

identify available portions of a system memory;

determine an amount of memory needed to execute a software application;

allocate available portions of the system memory to a graphics processor memory in response to determining to form a contiguous software application memory;

program a page table to commit addresses of the available portions;

execute the software application in the contiguous software application memory, the execute comprising looking up the addresses of the available portions of the system memory in the page table;

free an address range of the contiguous software application memory;

unmap pages allocated to the address range in a page table; and deallocate the available portions of the system memory.

13. The computer program of claim 12, wherein allocating further comprises requesting an amount of system memory from an operating system and receiving locations of the available portions of system memory from the operating system.

14. The computer program of claim 12, wherein deallocating comprises re-allocating the available portions of system memory to an operating system after the available portions are no longer needed by the graphics processor, the available portions of system memory allocated in blocks.

15. The computer program of claim 12, wherein allocating comprises generating a memory map for the graphics processor to the available portions of system memory.

16. The computer program of claim 15, wherein the available portions of system memory comprise physically discontiguous portions of system memory and the memory map makes the physically discontiguous portions of system memory appear contiguous to the graphics processor.

* * * * *